US012600462B2

(12) United States Patent　　　(10) Patent No.:　US 12,600,462 B2

Le Borloch　　　　　　　　　　　(45) Date of Patent:　　Apr. 14, 2026

(54) DEVICE FOR PILOTING AN AIRCRAFT AND ASSOCIATED METHOD

(71) Applicant: DASSAULT AVIATION, Paris (FR)

(72) Inventor: Jérôme Le Borloch, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 463 days.

(21) Appl. No.: 17/549,992

(22) Filed: Dec. 14, 2021

(65) Prior Publication Data

US 2022/0185454 A1　　　Jun. 16, 2022

(30) Foreign Application Priority Data

Dec. 15, 2020　　(FR) ..................................... 20 13253

(51) Int. Cl.
B64C 13/04　　　　(2006.01)
B64C 13/12　　　　(2006.01)

(52) U.S. Cl.
CPC .......... B64C 13/0421 (2018.01); B64C 13/12 (2013.01)

(58) Field of Classification Search
CPC ... B64C 13/04; B64C 13/042; B64C 13/0421; B64C 13/0423; B64C 13/0425; B64C 13/0427; B64C 13/12
See application file for complete search history.

(56) References Cited

U.S. PATENT DOCUMENTS

| 4,688,443 | A | | 8/1987 | Fabre et al. | |
| 2009/0314901 | A1 | | 12/2009 | Granier et al. | |
| 2012/0025029 | A1 | * | 2/2012 | Szulyk | G05G 11/00 |
| | | | | | 244/223 |

FOREIGN PATENT DOCUMENTS

| CN | 104520183 | A | * | 4/2015 | ............. | B64C 13/04 |
| EP | 0204598 | A1 | | 12/1986 | | |
| FR | 2888009 | A1 | | 1/2007 | | |
| FR | 2963318 | A1 | | 2/2012 | | |
| GB | 2427906 | A | * | 1/2007 | ............. | B64C 13/04 |
| GB | 2549270 | A | * | 10/2017 | ......... | B64C 13/0421 |

* cited by examiner

*Primary Examiner* — Joshua D Huson
*Assistant Examiner* — Anna L. Gordon
(74) *Attorney, Agent, or Firm* — Davidson Kappel LLC

(57)　　　　　　ABSTRACT

A piloting device for piloting an aircraft includes a first and a second control stick movably mounted on a support, a detection system for detecting the positions of the first and second control sticks, an elastic mechanism configured to apply a restoring force to the second control stick, first and second actuation systems configured to apply respective first and second position adjustment forces to the respective first and second control sticks, and a control module configured to control the second adjustment force so that the positions of the first and second control sticks are identical. The control module is configured to control the first adjustment force based on the second adjustment force and the restoring force.

12 Claims, 8 Drawing Sheets

14A

10

P

G

12

DEVICE FOR PILOTING AN AIRCRAFT AND ASSOCIATED METHOD

The present disclosure relates to a piloting device for piloting an aircraft of the type comprising a first control stick and a second control stick, each movably mounted on a support between a plurality of positions around a neutral position in at least one degree of freedom, the piloting device further comprising:

a detection system for detecting the position of the first control stick and second control stick, configured to generate first position data representing the position of the first control stick and second position data representing the position of the second control stick, a first elastic mechanism configured to apply a first restoring force to the first control stick, toward its neutral position, a second elastic mechanism configured to apply a second restoring force to the second control stick, toward its neutral position, a first actuation system configured to apply a first position adjustment force to the first control stick, according to each degree of freedom, a second actuation system configured to apply a second position adjustment force to the second control stick, according to each degree of freedom, and a control module configured to control the second position adjustment force based on the position data of the first control stick, so that the position of the first control stick in relation to its neutral position and the position of the second control stick in relation to its neutral position are identical.

BACKGROUND

Such a piloting device is intended to facilitate aircraft piloting by reproducing the position of a control stick of a pilot in charge of the aircraft on the control stick of the pilot not in charge of the aircraft. As such, the pilot that is not in charge can experience the controls carried out on the piloting control stick by the pilot in charge of the aircraft, through his/her own stick.

The document FR 2 888 009 describes such a piloting device.

SUMMARY

In the piloting device in question, when the pilot in charge and the pilot not in charge apply different controls to their respective control sticks, it is impossible to implement a generation of an effort representative of the control difference and to apply this effort on the sticks so that it is appreciated by the pilots.

One purpose of the present disclosure is to overcome this drawback by providing a piloting device that makes more accurate cooperation possible between the pilot in charge and the pilot not in charge.

To this end, the present disclosure provides a piloting device of the aforementioned type, wherein the control module is further configured to control the first position adjustment force based on the second position adjustment force and the second restoring force.

The device according to the present disclosure may comprise one or more of the following features, taken alone or in any technically feasible combination:

the piloting device has no system for measuring a control force applied to the first or second control stick by a crew member;

the second position adjustment force depends on a control force applied to the second control stick by an aircraft crew member;

the control module is configured to calculate the control force, the control force being equal to the second position adjustment force minus the second restoring force;

the first position adjustment force depends on the control force;

the first position adjustment force is equal to the control force;

the first position adjustment force is equal to the control force multiplied by a correction coefficient;

each elastic mechanism comprises one spring system per degree of freedom;

for at least one degree of freedom, the associated spring system of the first elastic mechanism has a spring constant according to said degree of freedom, the associated spring system of the second elastic mechanism has a spring constant according to said degree of freedom, the spring constant of the spring system of the first elastic mechanism being equal to the spring constant of the spring system of the second elastic mechanism multiplied by the absolute value of an asymmetry coefficient;

the spring system of the elastic mechanism comprises a main and an auxiliary spring group, the spring system of the elastic mechanism being configured such that:

the restoring force is applied by the main spring group when the associated control stick is moved between a first position and a second position, and the restoring force is applied by the main spring group and the auxiliary spring group when the associated control stick is moved between the second position and a third position;

each control stick is movable in at least two degrees of freedom, a first degree of freedom being defined along a longitudinal direction and a second degree of freedom being defined along a transverse direction, the transverse direction being substantially perpendicular to the longitudinal direction; and the control module is configured to control the first position adjustment force based on the position data of the second control stick such that the position of the second control stick in relation to its neutral position and the position of the first control stick in relation to its neutral position are identical, the control module being further configured to control the second position adjustment force based on the first position adjustment force and the first restoring force.

The present disclosure also provides a method for piloting an aircraft with a piloting device as described above, the method comprising the steps of:

moving of the first control stick in at least one degree of freedom, detection of the position of the first control stick by the detection system, generation of position data representing the position of the first control stick by the detection system, controlling of the second position adjustment force by the control module, based on the position data of the first control stick, so that the position of the first control stick in relation to its neutral position and the position of the second control stick in relation to its neutral position are identical, and controlling of the first position adjustment force by the control module, based on the second position adjustment force and the second restoring force.

The method according to the present disclosure may further comprise the following steps:

applying of a control force to the second control stick by a crew member, modification of the second position adjustment force by the control module, based on the control force applied to the second control stick by the crew member; and modification of the first positional adjustment force based on the second positional adjustment force and the second restoring force.

BRIEF SUMMARY OF THE DRAWINGS

The present disclosure will be better understood from the following description, given only by way of example, and made with reference to the appended drawings, in which.

DETAILED DESCRIPTION

Figure 1:
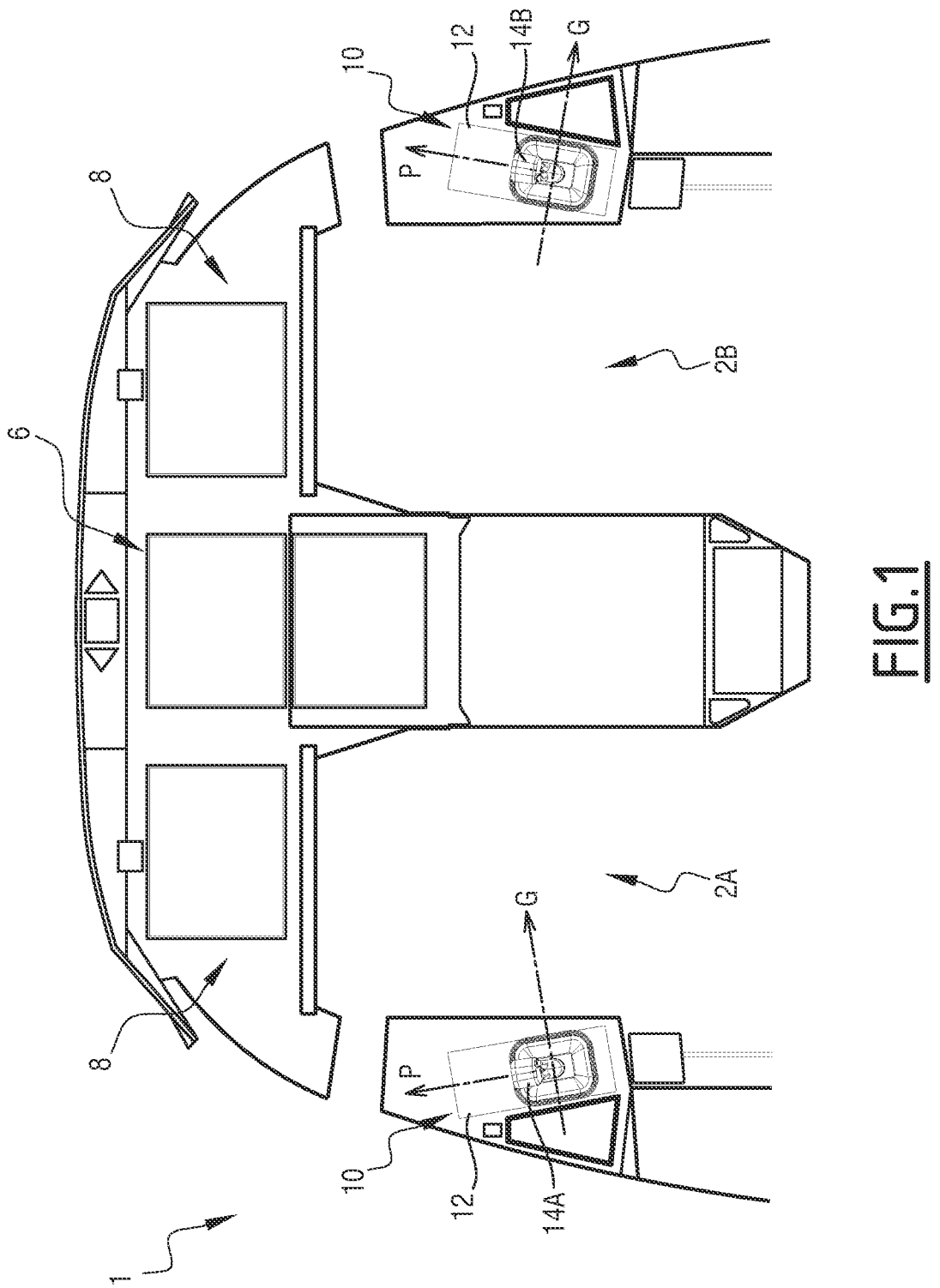
FIG. 1 is a schematic view from above of an aircraft cockpit in which a piloting device according to the present disclosure is implemented.

With reference to FIG. 1, an aircraft cockpit 1 is described. The cockpit 1 comprises a first cockpit area 2A and a second cockpit area 2B.

The first cockpit area 2A is intended to accommodate a first crew member, such as a pilot of the aircraft. The second cockpit area 2B is intended to accommodate a second crew member, such as a co-pilot of the aircraft.

The cockpit 1 comprises a control panel 6, for example. The control panel 6 comprises elements that are accessible and operable by the crew members. These elements are conventional and will not be described in detail here.

In the following, with reference to FIGS. 1 to 8, an aircraft piloting device 10 is described. Such a piloting device 10 is installed in the aircraft cockpit 1 comprising at least one display 8, intended to display piloting information to the crew, in a known manner.

The piloting device 10 is intended to make it possible for the pilot and/or co-pilot to pilot the aircraft by operating movable aircraft surfaces, to generate roll and pitch control, for example.

The piloting device 10 comprises a first support 12 located in the first cockpit area 2A, a second support 12 located in the second cockpit area 2B, a first control stick 14A mounted on the first support 12 and a second control stick 14B mounted on the second support 12. Each control stick 14A, 14B is mounted on the corresponding support 12, to move between a plurality of positions around a neutral position $p_N$ according to at least one degree of freedom.

In the following, application of the piloting device 10 to control controlled aircraft systems is described. The controlled systems are the aircraft's roll control surfaces and pitch control surfaces, for example. The roll control surfaces are aircraft ailerons, for aircraft roll control, for example, and the pitch control surfaces are the aircraft elevators, for aircraft pitch control, for example. The roll control surfaces and pitch control surfaces form movable aircraft surfaces.

The number of degrees of freedom is two, for example. Each degree of freedom has a neutral position $p_N$. The first degree of freedom is defined along a longitudinal direction P, corresponding to the pitch, for example. The second degree of freedom is defined along a transverse direction G perpendicular to the longitudinal direction, corresponding to the roll, for example.

The first degree of freedom corresponds to control over an aircraft pitch axis, for example. Movement of the control stick 14A, 14B toward the front of the aircraft corresponds to a command to dive the nose of the aircraft, for example. Movement of the control stick 14A, 14B toward the rear corresponds to a command to straighten the nose of the aircraft, for example.

The second degree of freedom corresponds to control over an aircraft roll axis, for example. Movement of the stick 14A, 14B to the right of the aircraft corresponds to a command to tilt the aircraft to the right, for example. Movement of the stick 14A, 14B to the left corresponds to a command to tilt the aircraft to the left, for example.

The aircraft is thus controlled by a crew member moving the control stick 14A, 14B according to at least one degree of freedom. The control stick 14A, 14B is moved by a crew member applying a control force to said control stick 14A, 14B. In the following, a control force applied by the pilot is referred to as pilot control force $F_{pp}$ and a control force applied by the co-pilot is referred to as co-pilot control force $F_{pc}$.

According to the described example, with reference to FIG. 1, the first control stick 14A is located on a left side of the first cockpit area 2A and the second control stick 14B is located on a right side of the second cockpit area 2B.

Figure 2:
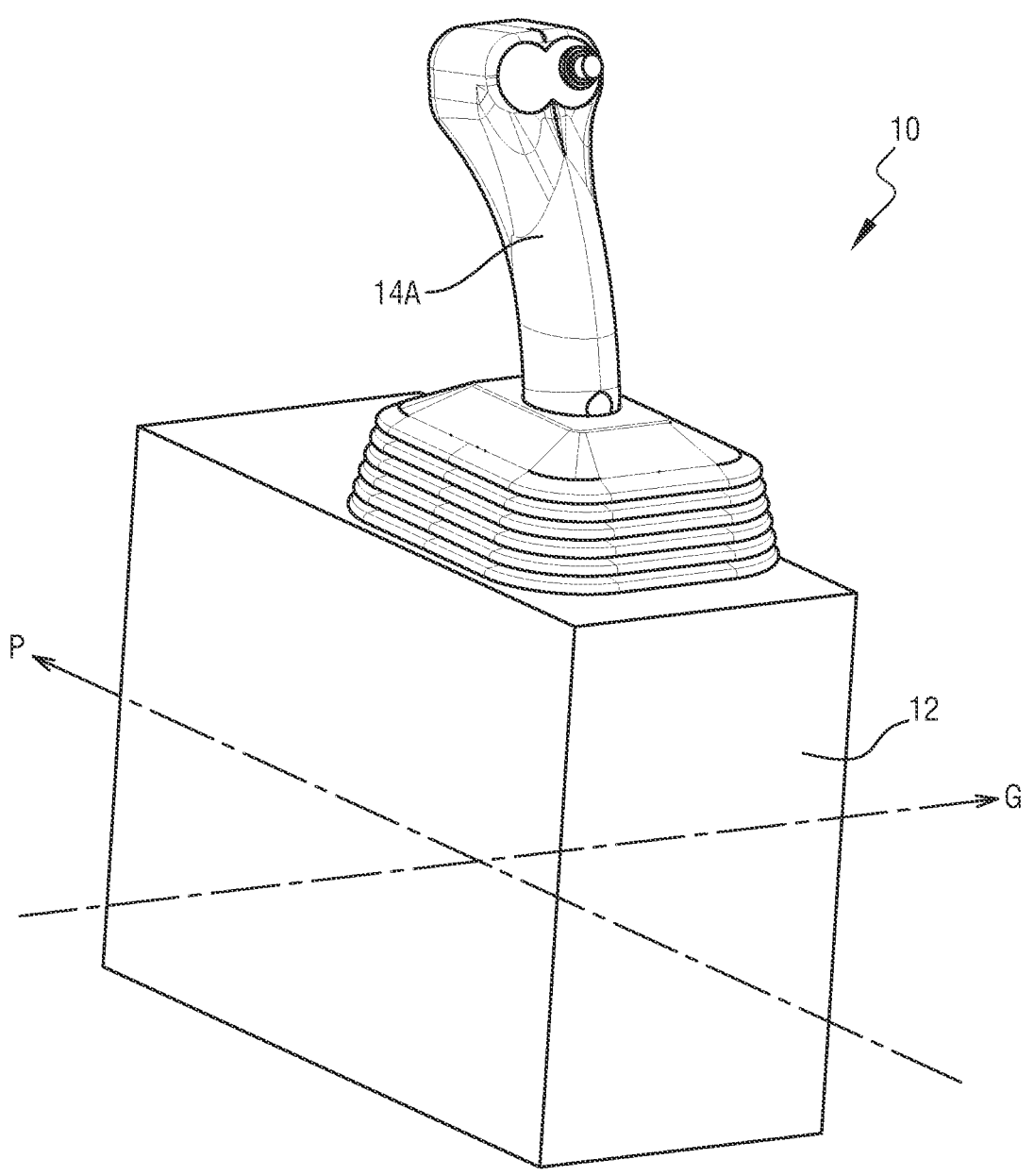
FIG. 2 is a three-quarter perspective view of part of the piloting device according to the present disclosure, including a control stick and a support on which the control stick is mounted.

FIG. 2 illustrates an example of a control stick 14A, 14B mounted on a support 12. In particular, FIG. 2 illustrates the stick 14A located in the first cockpit area 2A.

Figure 3:
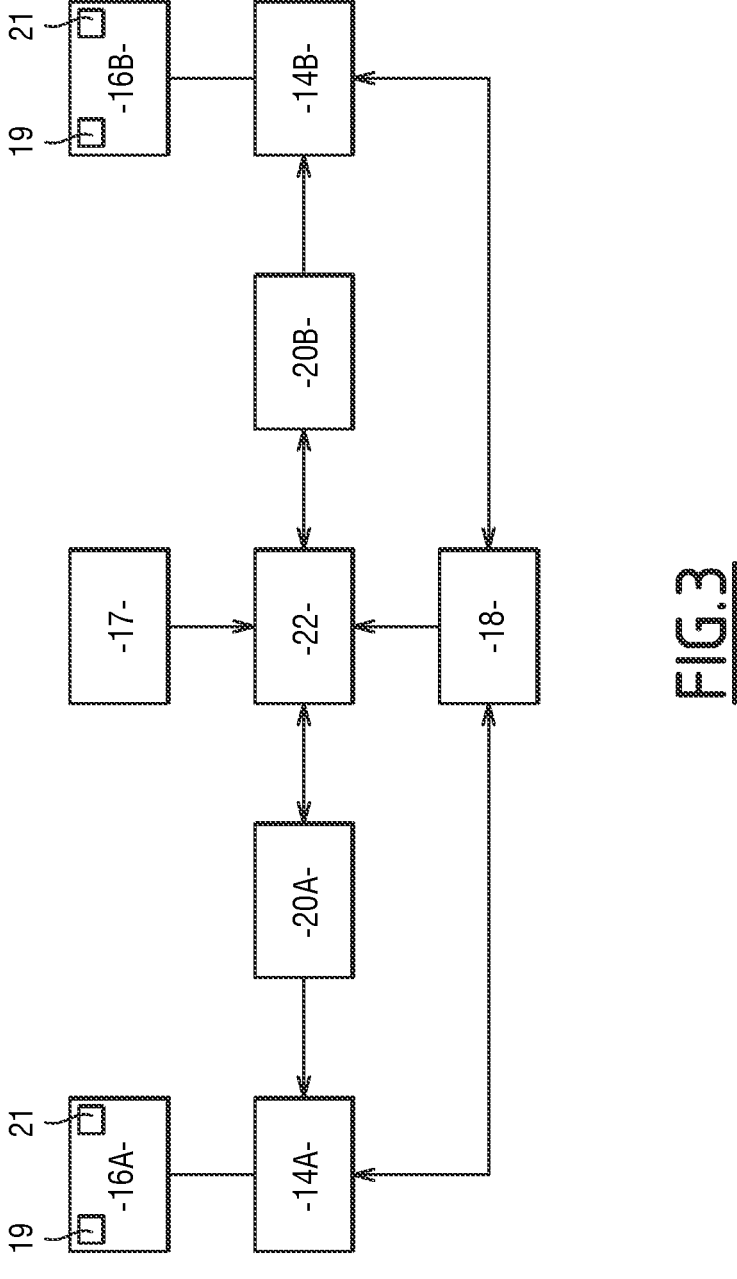
FIG. 3 is a schematic representation of the piloting device according to the present disclosure.

With reference to FIG. 3, the piloting device 10 further comprises a first elastic mechanism 16A, configured to apply a first restoring force $F_{RA}$ to the first control stick 14A, toward its neutral position $p_N$, a second elastic mechanism 16B configured to apply a second restoring force $F_{RB}$ to the second control stick 14B, toward its neutral position $p_N$, and a memory 17 containing restoring force data representing the first and second restoring forces, $F_{RA}$, $F_{RB}$.

The piloting device 10 further comprises a detection system 18 for detecting the position of the first control stick 14A and the second control stick 14B, a first actuation system 20A, configured to apply a first position adjustment force $F_{AA}$ to the first control stick 14A according to the degree of freedom, and a second actuation system 20B, configured to apply a second position adjustment force $F_{AB}$ to the second control stick 14B according to the degree of freedom, The piloting device 10 further comprises a control module 22, configured to control the first position adjustment force $F_{AA}$ and the second position adjustment force $F_{AB}$.

The control module 22 is formed by a software module, for example, within at least one computer with a memory suitable for receiving the module and a processor suitable for executing the software module stored in said memory.

The piloting device 10 is devoid of system for measuring the control force applied by a crew member to the first or second control stick 14A, 14B.

The first restoring force $F_{RA}$ applied by the first elastic mechanism 16A breaks down into a component along the pitch axis $F_{RAp}$ and a component along the roll axis $F_{RAg}$.

The second restoring force $F_{RB}$ applied by the second elastic mechanism 16B breaks down into a component along the pitch axis $F_{RBp}$ and a component along the roll axis $F_{RBg}$.

Each elastic mechanism 16A, 16B comprises at least one spring system. Each elastic mechanism 16A, 16B comprises a spring system for pitch and a spring system for roll, for example. The component along the pitch axis $F_{RAp}$, $F_{RBp}$ of the restoring force $F_{RA}$, $F_{RB}$ is applied by the corresponding pitch spring system. The component along the roll axis $F_{RAg}$, $F_{RBg}$ of the restoring force $F_{RA}$, $F_{RB}$ is applied by the corresponding roll spring system.

Figure 4:
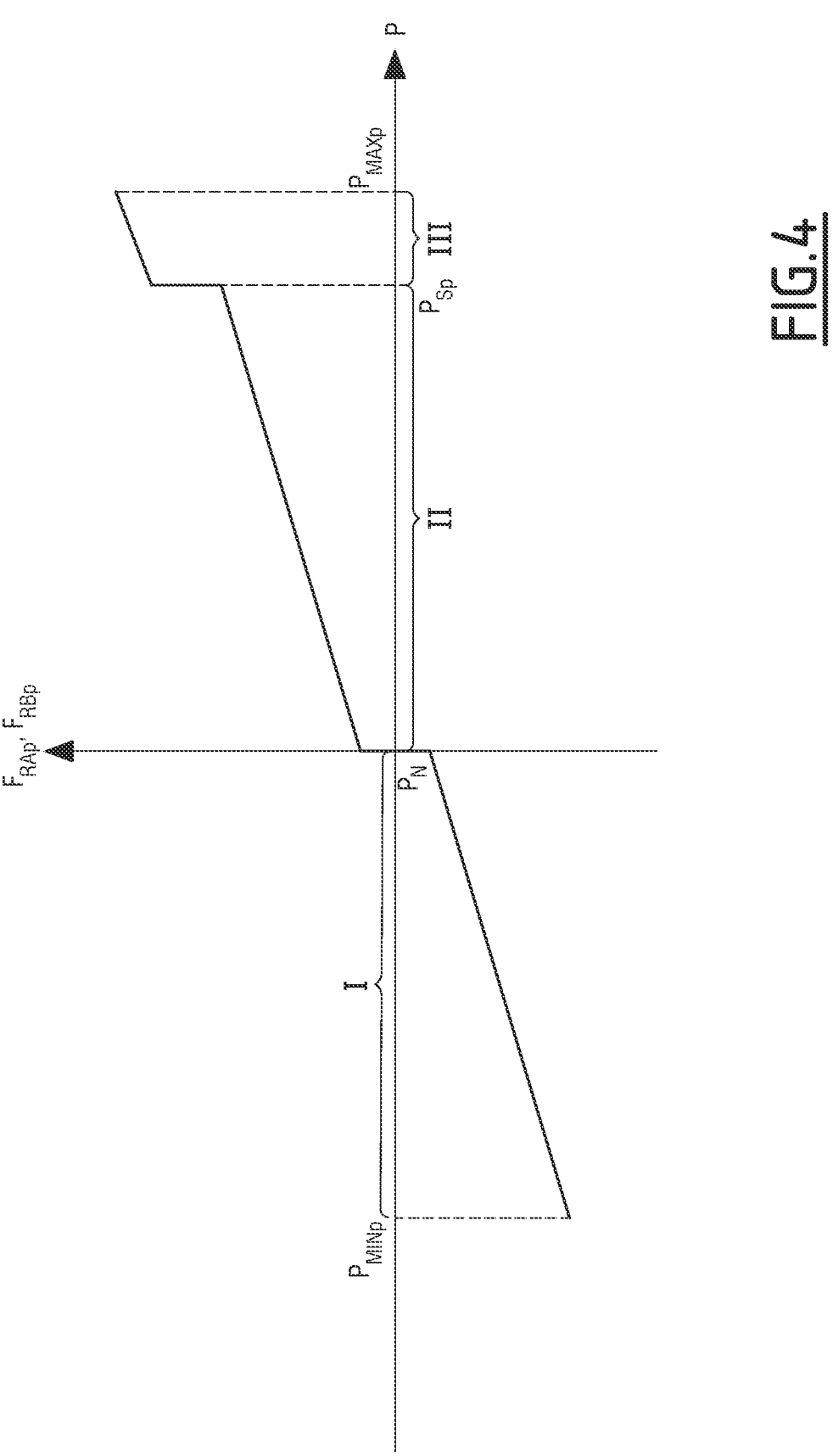
FIG. 4 is an example of a profile of a force applied by an elastic mechanism to each control stick, for pitch control, based on the position of said control stick in relation to neutral.

The components along the pitch axis $F_{RAp}$, $F_{RBp}$ follow a pitch restoring force profile. The pitch restoring force profile associates a pitch axis component value $F_{RAp}$, $F_{RBp}$ of return force $F_{RA}$, $F_{RB}$ with each position of the control stick 14A, 14B according to the pitch axis. An example of such a pitch restoring force profile is shown in FIG. 4.

The component along the roll axis $F_{RAg}$ of the first restoring force $F_{RA}$ follows a first roll restoring force profile. The first roll restoring force profile associates a roll axis component value $F_{RAg}$ of the first restoring force $F_{RA}$ with each position of the first control stick 14A according to the roll axis. An example of such a first roll restoring force profile is shown in FIG. 5.

The component along the roll axis $F_{RBg}$ of the second restoring force $F_{RB}$ follows a second roll restoring force profile. The second roll restoring force profile associates a roll axis component value $F_{RBg}$ of the second restoring force $F_{RB}$ with each position of the second control stick 14B according to the roll axis. An example of such a second roll restoring force profile is illustrated in FIG. 6.

As such, each restoring force profile associates a restoring force value applied by the corresponding spring systems based on the position of the corresponding control stick 14A, 14B, according to the corresponding degree of freedom.

Figure 5:
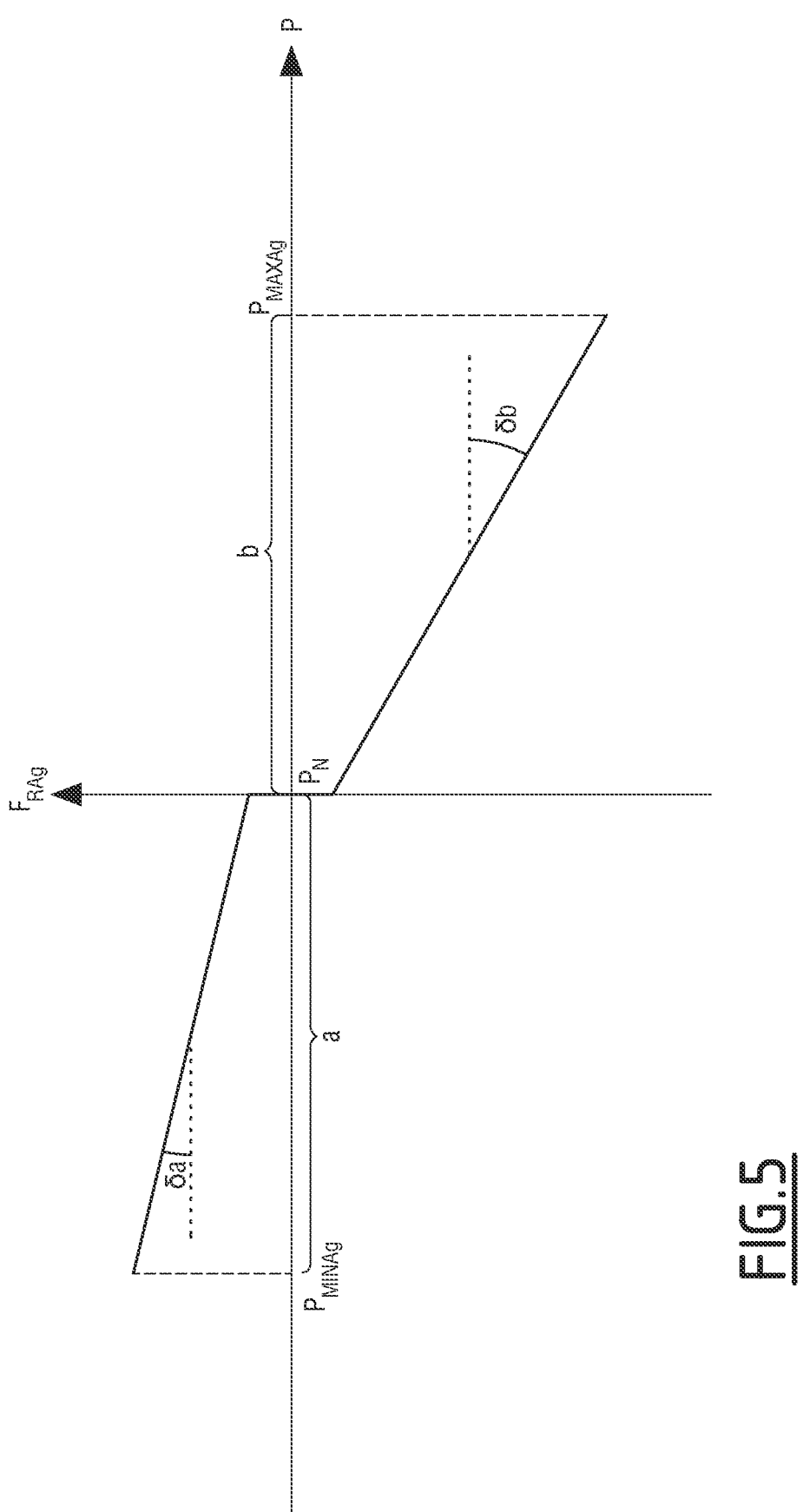
FIG. 5 is an example of a profile of a force applied by an elastic mechanism to the first control stick, for roll control, based on the position of said first control stick in relation to neutral.
Figure 6:
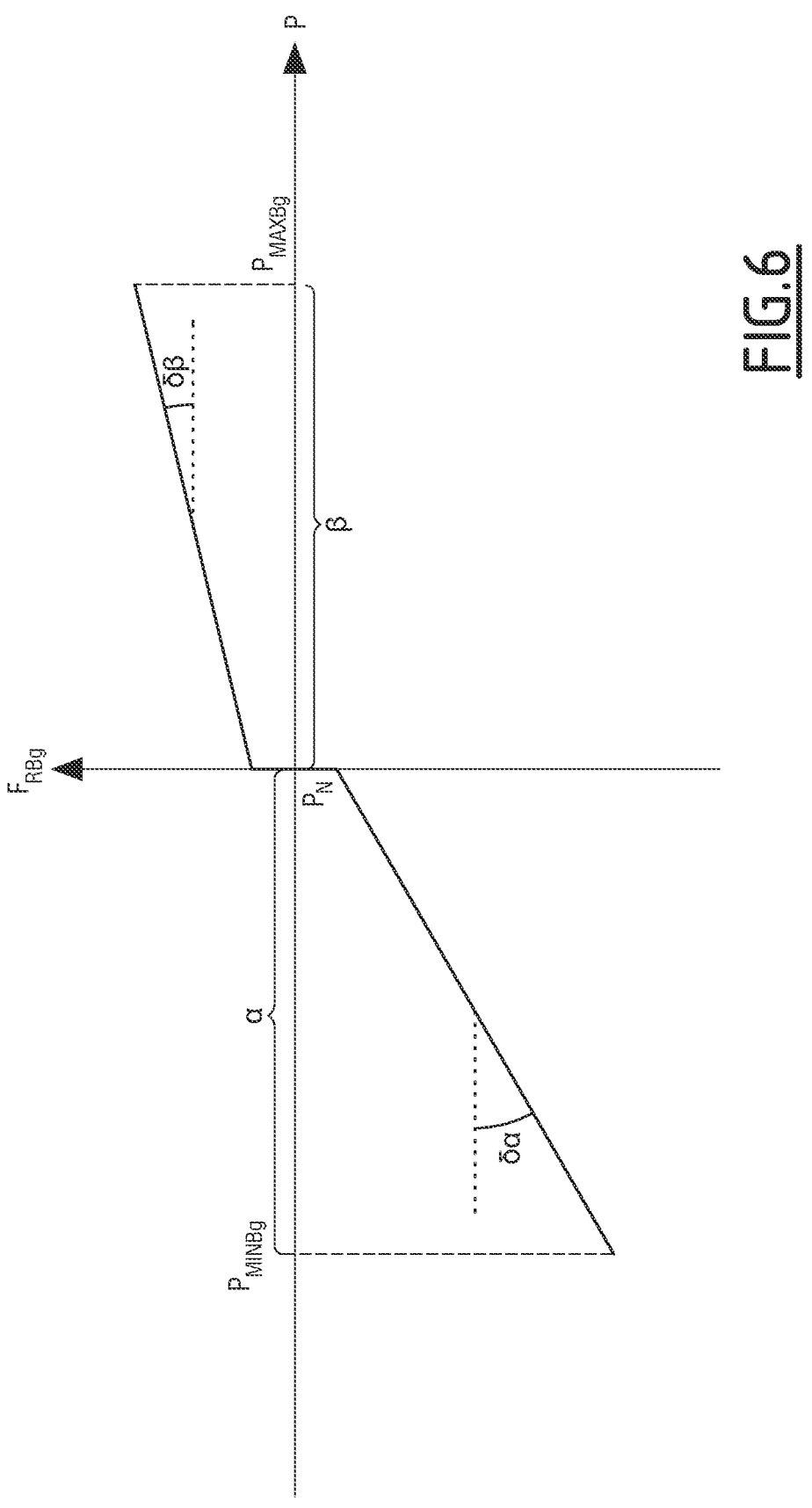
FIG. 6 is an example of a profile of a force applied by a elastic mechanism to the second control stick, for roll control, based on the position of said second control stick in relation to neutral.

In FIGS. 4, 5, and 6, each restoring force profile is plotted as a function of the position p of the corresponding control stick 14A, 14B, according to the corresponding degree of freedom. The null position represents the neutral position $p_N$ of the control stick 14A, 14B according to the corresponding degree of freedom.

In FIG. 4, the positive positions represent positions in which the control stick 14A, 14B is moved to the front of the aircraft in relation to the neutral position $p_N$ and the negative positions represent positions in which the stick 14A, 14B is moved toward the rear of the aircraft in relation to the neutral position $p_N$.

In FIGS. 5 and 6, the positive positions represent positions in which the stick 14A, 14B is moved toward the right of the aircraft in relation to the neutral position $p_N$ and the negative positions represent positions in which the stick 14A, 14B is moved toward the left of the aircraft in relation to the neutral position $p_N$.

With reference to FIG. 4, the pitch restoring force profile has three distinct portions I, II, and III. The first portion I extends between a minimum pitch position $p_{MINp}$, corresponding to an extreme rear position of the control stick 14A, 14B, and the neutral position $p_N$. The second portion II extends between the neutral position $p_N$ and an intermediate position $p_{Sp}$, corresponding to a jump in restoring force. The third portion III extends between the intermediate position $p_{Sp}$ and a maximum pitch position $p_{MAXp}$, corresponding to an extreme forward position of the control stick 14A, 14B. At the neutral point $p_N$, the pitch restoring force profile exhibits a restoring force jump, corresponding to a pitch restoring force threshold. As illustrated in FIG. 4, portion II is symmetrical to portion I in relation to the neutral point $p_N$ over the position range $[P_N; P_{Sp}]$, for example.

With reference to FIG. 5, the first roll restoring force profile has two distinct portions a and b. The first portion a extends between a first minimum roll position $p_{MINAg}$, corresponding to an extreme position of the first control stick 14A to the left, and the neutral position $p_N$. The second portion b extends between the neutral position $p_N$ and a first maximum roll position $p_{MAXAg}$, corresponding to an extreme position of the first control stick 14A to the right. At the neutral point $p_N$, the first roll restoring force profile has a restoring force jump corresponding to a roll restoring force threshold. The first portion a has a first slope da and the second portion b has a second slope $\delta_b$. In absolute value, the first slope $\delta_a$ is smaller than the second slope $\delta_b$. This difference between the slopes $\delta_a$ and $\delta_b$ compensates for the difference in effort required to move the first control stick 14A to the left (outward, requiring more effort with the left hand) than to the right (inward, requiring less effort with the left hand).

With reference to FIG. 6, the second roll restoring force profile has two distinct portions $\alpha$ and $\beta$. The first portion $\alpha$ extends between a second minimum roll position $p_{MINBg}$, corresponding to an extreme position of the second control stick 14B to the left, and the neutral position $p_N$. The second portion $\beta$ extends between the neutral position $p_N$ and a second maximum roll position $p_{MAXBg}$, corresponding to an extreme position of the second control stick 14B to the right. At the neutral point $p_N$, the first roll restoring force profile has a restoring force jump, corresponding to a roll restoring force threshold. The first portion $\alpha$ has a first slope $\delta_a$ and the second portion $\beta$ has a second slope $\delta_\beta$. In absolute value, the first slope da is greater than the second slope $\delta_\beta$. This difference between the slopes $\delta_\alpha$ and $\delta_\beta$ compensates for the difference in effort required to move the second control stick 14B to the left (inward, requiring less effort with the right hand) than to the right (outward, requiring more effort with the right hand).

With reference to FIG. 5, the roll spring system of the first elastic mechanism 16A has a first roll spring constant over the positional range $[P_{MINAg}; P_N]$. The first roll spring constant of the roll spring system of the first elastic mechanism 16A corresponds to the absolute value of the first slope Sa of the first roll restoring force profile. The roll spring system of the first elastic mechanism 16A has a second roll spring constant over the positional range [$P_N$; $P_{MAXAg}$]. The second roll spring constant of the roll spring system of the first elastic mechanism 16A corresponds to the absolute value of the second slope &b of the first roll restoring force profile.

With reference to FIG. 6, the roll spring system of the second elastic mechanism 16B has a first roll spring constant over the position range [$P_{MINBg}$; $P_N$]. The first roll spring constant of the roll spring system of the second elastic mechanism 16B corresponds to the absolute value of the first slope $\delta_\alpha$ of the second roll restoring force profile. The roll spring system of the second elastic mechanism 16B has a second roll spring constant over the position range [$P_N$; $P_{MAXBg}$]. The second roll spring constant of the roll spring system of the second elastic mechanism 16B corresponds to the absolute value of the second slope $\delta_\beta$ of the second roll restoring force profile.

The first slope $\delta_a$ of the first roll restoring force profile is equal to the first slope $\delta_\alpha$ of the second roll restoring force profile multiplied by an asymmetry coefficient. The second slope $\delta_b$ of the first roll restoring force profile is equal to the second slope $\delta_\beta$ of the second roll restoring force profile multiplied by the asymmetry coefficient. In particular, the asymmetry coefficient is negative.

The first roll spring constant of the roll spring system of the first elastic mechanism 16A is equal to the first roll spring constant of the spring system of the second elastic mechanism 16B multiplied by the absolute value of the asymmetry coefficient.

The second roll spring constant of the roll spring system of the first elastic mechanism 16A is equal to the second roll spring constant of the spring system of the second elastic mechanism 16B multiplied by the absolute value of the asymmetry coefficient.

The pitch spring system of each elastic mechanism 16A, 16B comprises a main spring group 19 and an auxiliary spring group 21.

The pitch spring system of each elastic mechanism 16A, 16B is configured such that the restoring force $F_{RA}$, $F_{RB}$ is applied by the main spring group 19 when the associated control stick is moved between a first and a second position. In particular, the pitch axis component $F_{RAp}$, $F_{RBp}$ of the restoring force $F_{RA}$, $F_{RB}$ is applied by the main spring group 19 as the associated control stick 14A, 14B is moved between the first and the second position.

The pitch spring system of each elastic mechanism 16A, 16B is configured such that the restoring force $F_{RA}$, $F_{RB}$ is applied by the main spring group 19 and the auxiliary spring group 21 when the associated control stick is moved between the second position and a third position. In particular, the pitch axis component $F_{RAp}$, $F_{RBp}$ of the restoring force $F_{RA}$, $F_{RB}$ is applied by the main spring group 19 and the auxiliary spring group 21 when the associated control stick 14A, 14B is moved between the second position and the third position.

With reference to FIG. 4, the first position is the neutral position $p_N$. The second position is the intermediate position $p_{Sp}$. The third position is the maximum pitch position $p_{MAXp}$.

In this way, as illustrated in FIG. 4, the pitch spring system of each elastic mechanism 16A, 16B has a first spring constant on portion II and a second spring constant on portion III. The second spring constant of the pitch spring system of each elastic mechanism 16A, 16B is greater than the first spring constant of the pitch spring system of each elastic mechanism 16A, 16B.

The memory 17 comprises at least a first set of restoring force data, representing the first restoring force $F_{RA}$ according to each degree of freedom, and at least a second set of restoring force data, representing the second restoring force $F_{RB}$ according to each degree of freedom.

The first restoring force data set comprises a first pitch restoring force data subset, representing the pitch axis component $F_{RAp}$ of the first restoring force $F_{RA}$ and a first roll restoring force data subset, representing the roll axis component $F_{RAg}$ of the first restoring force $F_{RA}$.

For each position of the first control stick 14A according to the pitch axis, the first pitch restoring force data subset associates the component $F_{RAp}$ according to the pitch axis of the corresponding first restoring force $F_{RA}$ applied by the first elastic mechanism 16A. For each position of the first control stick 14A according to the roll axis, the first roll restoring force data subset associates the component $F_{RAg}$ along the roll axis of the corresponding first restoring force $F_{RA}$ applied by the first elastic mechanism 16A.

The second restoring force data set includes a second pitch restoring force data subset, representing the pitch axis component $F_{RBp}$ of the second restoring force $F_{RB}$ and a second pitch restoring force data subset, representing the roll axis component $F_{RBg}$ of the second restoring force $F_{RB}$.

For each position of the second control stick 14B according to the pitch axis, the second pitch restoring force data subset associates the component $F_{RBp}$ according to the pitch axis of the corresponding second restoring force $F_{RB}$ applied by the second elastic mechanism 16B. For each position of the second control stick 14B along the roll axis, the second roll restoring force data subset associates the component $F_{RBg}$ along the roll axis of the corresponding second restoring force $F_{RB}$ applied by the second elastic mechanism 16B.

As illustrated in FIG. 3, the system 18 for detecting the position of the first 14A and second control stick 14B is connected to each control stick 14A, 14B. It is configured to generate first position data, representing the position of the first control stick 14A and second position data, representing the position of the second control stick 14B.

The first position data represents the position of the first control stick 14A according to each degree of freedom. The second position data represents the position of the second control stick 14B according to each degree of freedom.

Figure 7:
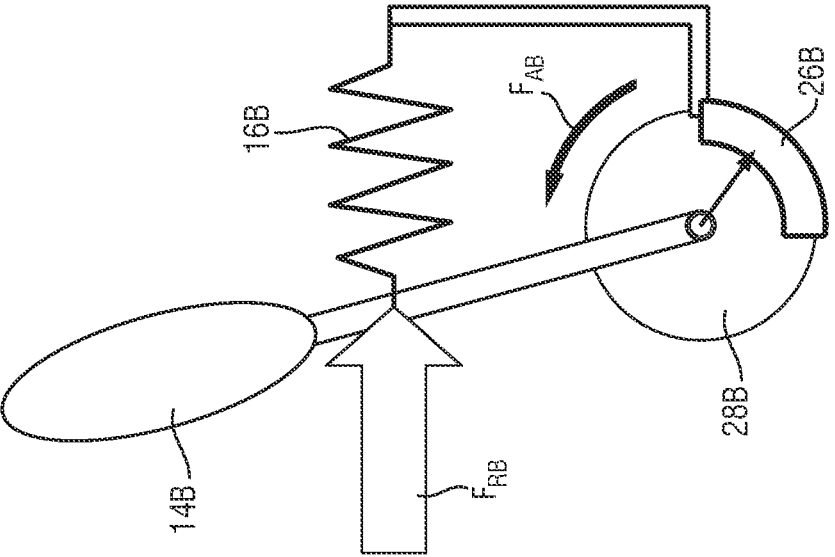
FIG. 7 is a simplified schematic representation of the piloting device according to the present disclosure, a first control stick being subjected to a force applied by a first crew member, a second control stick being subjected to an adjustment force, so that the positions of each stick in relation to their neutral are identical.
Figure 7:
Figure 7:
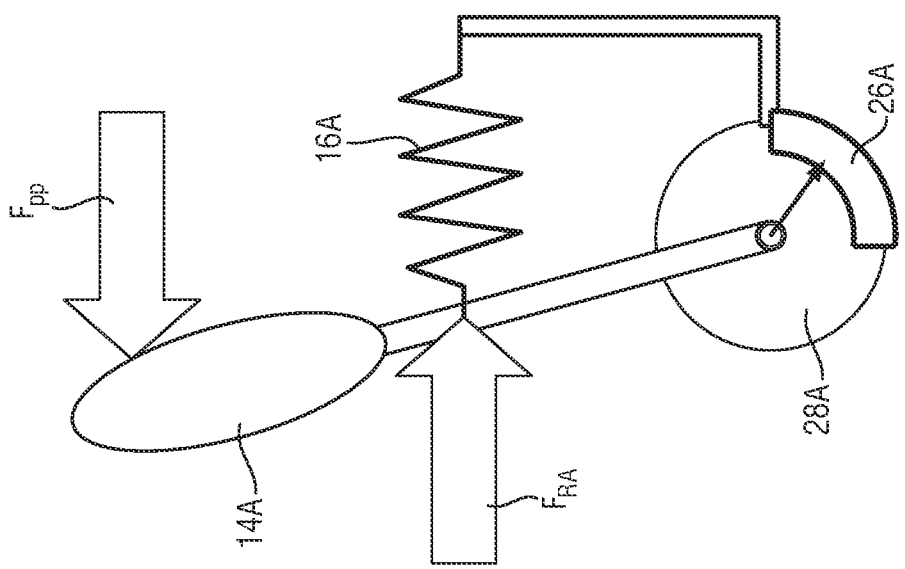
Figure 8:
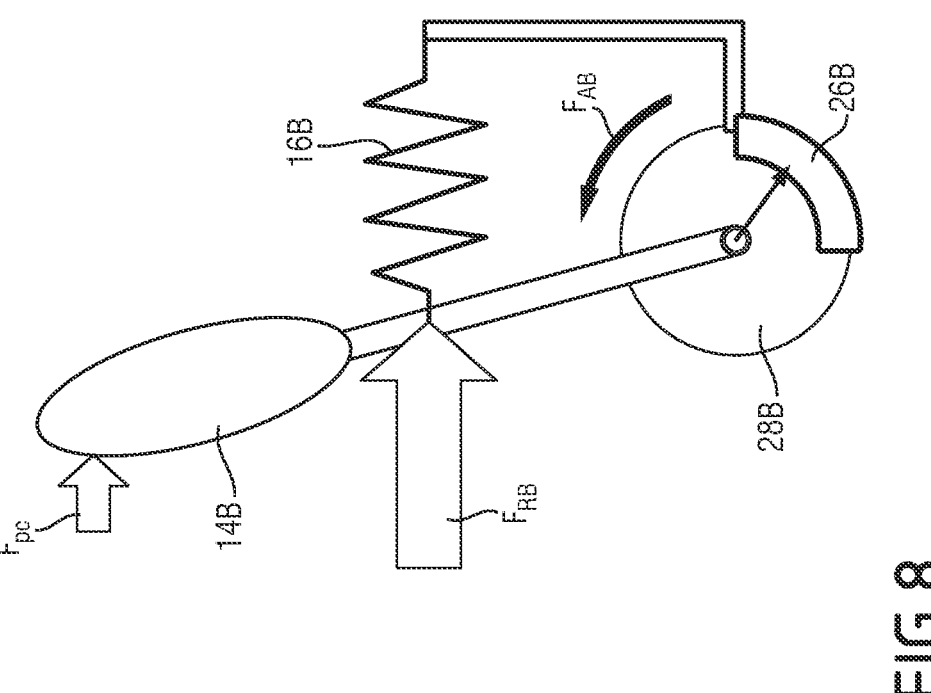
FIG. 8 is a schematic representation similar to that of FIG. 7, the second control stick being subjected to a force applied by a second crew member, the first control stick being subjected to an adjustment force based on the force applied by the second crew member.
Figure 8:
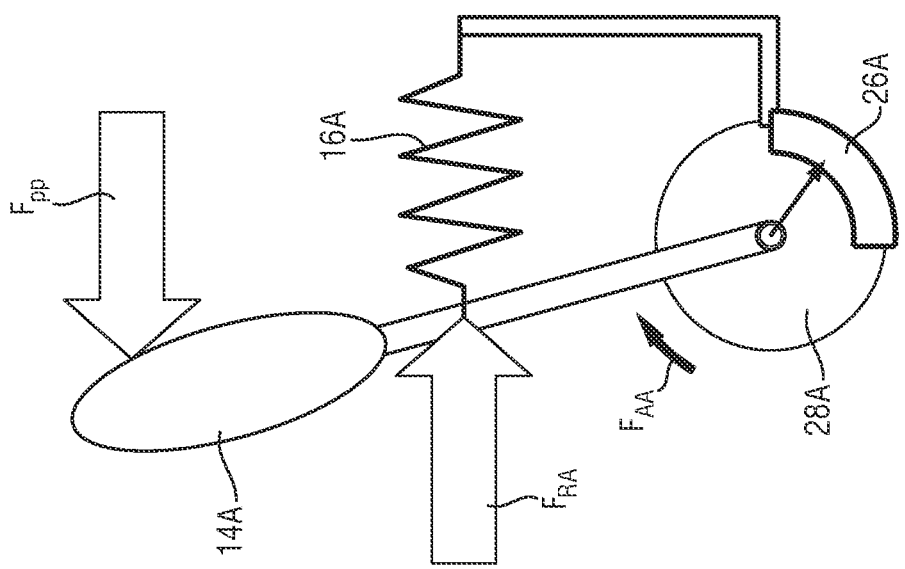

As illustrated in FIGS. 7 and 8, for each degree of freedom, the detection system 18 comprises a first position sensor 26A, the first position sensors 26A being configured to generate the first position data and, for each degree of freedom, a second position sensor 26B, the second position sensors 26B being configured to generate the second position data.

The first and second position data are sent to an aircraft piloting control module, for example. The movable surfaces of the aircraft are controlled based on this position data.

The first actuation system 20A is configured to move the first control stick 14A according to each degree of freedom when the second control stick 14B is moved, in order to equalize the positions of the first and second sticks in relation to the neutral position $p_N$. The first actuation system 20A comprises an actuator 28A for each degree of freedom. Each actuator 28A of the first actuation system 20A is configured to move the first control stick 14A according to the associated degree of freedom.

To move the first stick 14A, the first actuation system 20A is configured to apply the first position adjustment force $F_{AA}$ to the first control stick 14A. The first position adjustment force $F_{AA}$ is broken down into a component along the pitch axis $F_{AAp}$ and a component along the roll axis $F_{AAg}$.

An actuator 28A of the first actuation system 20A is configured to apply the pitch axis component $F_{AAp}$ of the first pitch axis position adjustment force $F_{AA}$. Another actuator 28A of the first actuation system 20A is configured to apply the component along the roll axis $F_{AAg}$ of the first position adjustment force $F_{AA}$ along the roll axis.

The first actuation system 20A is further configured to generate first adjustment force data, representing the first position adjustment force $F_{AA}$ applied by the actuators of the first actuation system 20A according to each degree of freedom. In particular, first adjustment force data represent each component $F_{AAp}$, $F_{AAg}$ of the first position adjustment force $F_{AA}$.

The second actuation system 20B is configured to move the second control stick 14B according to each degree of freedom when the first control stick 14A is moved. The second actuation system 20B comprises an actuator 28B for each degree of freedom. Each actuator 28B of the second actuation system 20B is configured to move the second stick 14B according to the associated degree of freedom.

To move the second stick 14B, the second actuation system 20B is configured to apply the second adjustment force $F_{AB}$ to the second control stick 14B. The second position adjustment force $F_{AB}$ is broken down into a pitch axis component $F_{ABp}$ and a roll axis component $F_{ABg}$.

An actuator 28B of the second actuation system 20B is configured to apply the pitch axis component $F_{ABg}$ of the second position adjustment force $F_{AB}$ along the pitch axis. Another actuator 28B of the second actuation system 20B is configured to apply the roll axis component $F_{ABg}$ of the second position adjustment force $F_{AB}$ along the roll axis.

The second actuation system 20B is further configured to generate second adjustment force data representing the second position adjustment force $F_{AB}$ applied by the actuators of the second actuation system 20B according to each degree of freedom. In particular, second adjustment force data represent each component $F_{ABp}$, $F_{ABg}$ of the second position adjustment force $F_{AB}$.

The control module 22 is connected to the memory 17, the detection system 18 and the actuation systems 20A, 20B.

The control module 22 is configured to receive the first pitch and roll restoring force data subsets and the second pitch and roll restoring force data subsets from the memory 17.

The control module 22 is configured to receive the first and second position data from the detection system 18. It is further configured to deduce therefrom the position of the first control stick 14A and the position of the second control stick 14B according to each degree of freedom.

The control module 22 is further configured to receive first force data from the first actuation system 20A and second force data from the second actuation system 20B. It is further configured to calculate the first position adjustment force $F_{AA}$ according to each degree of freedom, from the first force data, and the second position adjustment force $F_{AB}$ according to each degree of freedom, from the second force data.

As illustrated in FIG. 7, the control module 22 is further configured to control the second actuation system 20B, to control the second position adjustment force $F_{AB}$ according to the position data of the first control stick 14A such that the position of the first control stick 14A in relation to its neutral position $p_N$ and the position of the second control stick 14B in relation to its neutral position $p_N$ are identical, according to each degree of freedom.

As illustrated in FIG. 8, the control module 22 is further configured to control the first actuation system 20A to control the first position adjustment force $F_{AA}$ based on the second position adjustment force $F_{AB}$ and the second restoring force $F_{RB}$ according to each degree of freedom.

The second position adjustment force $F_{AB}$ depends on the co-pilot control force $F_{pc}$ applied to the second control stick 14B by the co-pilot in the case where the co-pilot applies a control force. As illustrated in FIG. 8, the control force $F_{pc}$ applied by the co-pilot tends to move the second control stick 14B away from a position that is identical to that of the first control stick 14A, for example. The second position adjustment force $F_{AB}$ must therefore counter this co-pilot control force $F_{pc}$ applied by the co-pilot, to keep the position of the second control stick 14B identical to that of the first control stick 14A.

The control module 22 is configured to calculate the co-pilot control force $F_{pc}$. From the second position data and second pitch and roll restoring force data subsets, the control module 22 derives the second restoring force $F_{RB}$ experienced by the second control stick 14B. The co-pilot control force $F_{pc}$ is equal to the second position adjustment force $F_{AB}$ minus the second restoring force $F_{RB}$ according to the associated degree of freedom.

The control module 22 is further configured to control the first position adjustment force $F_{AA}$ such that the first position adjustment force $F_{AA}$ depends on the co-pilot control force $F_{pc}$.

In the case of the pitch axis, the control module 22 is configured to control the first position adjustment force $F_{AA}$ so that it is equal to the co-pilot control force $F_{pc}$. The pilot feels the force applied by the co-pilot on his control stick 14B via his/her stick 14A.

In the case of the roll axis, the control module 22 is configured to control the first position adjustment force $F_{AA}$ so that it is equal to the co-pilot control force $F_{pc}$ multiplied by a correction coefficient. The correction coefficient compensates for the asymmetry between the roll restoring force profiles of the first and second elastic mechanisms 16A, 16B. The correction coefficient is equal to the absolute value of the asymmetry coefficient, for example.

Symmetrically, when the co-pilot applies a control force, the control module 22 is configured to control the first position adjustment force $F_{AA}$ based on the position data of the second control stick 14B so that the position of the second control stick 14B in relation to its neutral position and the position of the first control stick 14A in relation to its neutral position are identical.

Symmetrically, the control module 22 is further configured to control the second position adjustment force $F_{AB}$ based on the first position adjustment force $F_{AA}$ and the first restoring force $F_{RA}$ when the pilot applies a control force.

In the following, a method for controlling an aircraft with the piloting device 10 is described.

In an initial state, the first and second sticks 14A, 14B are in their neutral position $p_N$, for example. The pilot is the pilot in charge.

The pilot moves the first control stick 14A in at least one degree of freedom, for example. To do so, the pilot applies a pilot control force $F_{pp}$ to the first control stick 14A.

The detection system 18 detects the position of the first control stick 14A.

The detection system 18 generates at least one position data item, showing the position of the first control stick 14A.

The control module 22 controls the second position adjustment force $F_{AB}$ based on the position data of the first control stick 14A such that the position of the first control stick 14A in relation to its neutral position $p_N$ and the position of the second control stick 14B in relation to its neutral position $p_N$ are identical.

When the co-pilot does not apply any force to his control stick 14B, the control sticks 14A and 14B are thus in the same position in relation to the neutral position $p_N$.

The control module 22 further controls the first position adjustment force $F_{AA}$ based on the second position adjustment force $F_{AB}$ and the second restoring force $F_{RB}$. When the co-pilot does not apply any force to his control stick 14B, the first position adjustment force $F_{AA}$ is zero.

In some cases, the co-pilot applies a co-pilot control force $F_{pc}$ to the second control stick 14B.

The control module 22 then modifies the second position adjustment force $F_{AB}$ based on the co-pilot control force $F_{pc}$ applied to the second stick 14B by the co-pilot, to counteract the force applied by the co-pilot.

The control module 22 further modifies the first position adjustment force $F_{AA}$ based on the second position adjustment force $F_{AB}$ and the second restoring force $F_{RB}$. Along the pitch axis, the control module 22 controls the first position adjustment force $F_{AA}$ so that it is equal to the co-pilot control force $F_{pc}$. Along the roll axis, the control module 22 controls the first position adjustment force $F_{AA}$ so that it is equal to the co-pilot control force $F_{pc}$ multiplied by the correction coefficient.

Thanks to the piloting device according to the present disclosure, the co-pilot has improved awareness of the commands made by the pilot through his/her co-piloting stick, Through his/her piloting stick, the pilot also has improved awareness of force applied by the co-pilot on his/her piloting stick.

As such, each crew member has an almost instantaneous awareness of all the forces applied to the sticks of the device.

In addition, despite the first and second sticks coupling, the piloting device makes it possible for each crew member to feel the restoring force profile associated to said stick, through his/her stick, without feeling the restoring force profile associated to the other stick. Thus, whether or not coupling between the first and second sticks fails, in terms of the restoring force applied to the stick, each crew member feels only the restoring force profile associated to said stick through his/her stick.

What is claimed is:

1. A piloting device for piloting an aircraft comprising a first control stick and a second control stick, each movably mounted on a support between a plurality of positions around a neutral position in at least one degree of freedom, the piloting device further comprising:
  a detection system for detecting the position of the first control stick and second control stick, configured to generate first position data representing the position of the first control stick and second position data representing the position of the second control stick;
  a first elastic mechanism configured to apply a first restoring force to the first control stick, toward its neutral position;
  a second elastic mechanism configured to apply a second restoring force to the second control stick, toward its neutral position;
  a first actuation system configured to apply a first position adjustment force to the first control stick, according to each degree of freedom;

a second actuation system configured to apply a second position adjustment force to the second control stick, according to each degree of freedom;
  a control module configured to control the second position adjustment force based on the position data of the first control stick so that the position of the first control stick in relation to its neutral position and the position of the second control stick in relation to its neutral position are identical;
  wherein the control module is further configured to control the first position adjustment force based on the second position adjustment force and the second restoring force,
  wherein the second position adjustment force depends on a control force applied to the second control stick by an aircraft crew member,
  wherein the control module is configured to calculate the control force applied to the second control stick, the control force being equal to the second position adjustment force minus the second restoring force,
  wherein the first position adjustment force depends on the control force applied to the second control stick,
  wherein the first position adjustment force is equal to the control force applied to the second control stick.

2. The piloting device according to claim 1, without any system for measuring the control force applied to the first or second control stick by a crew member.

3. The piloting device according to claim 1, wherein each elastic mechanism comprises one spring system per degree of freedom.

4. The piloting device according to claim 3, wherein, for at least one degree of freedom, the associated spring system of the first elastic mechanism has a spring constant according to said degree of freedom, the associated spring system of the second elastic mechanism has a spring constant according to said degree of freedom, the spring constant of the spring system of the first elastic mechanism being equal to the spring constant of the spring system of the second elastic mechanism multiplied by the absolute value of an asymmetry coefficient.

5. The piloting device according to claim 3, wherein the spring system of the elastic mechanism comprises a main spring group and an auxiliary spring group, the spring system of the elastic mechanism being configured such that:
  the restoring force is applied by the main spring group when the associated control stick is moved between a first position and a second position; and
  the restoring force is applied by the main spring group and the auxiliary spring group when the associated control stick is moved between the second position and a third position.

6. The piloting device according to claim 1, wherein each control stick is movable in at least two degrees of freedom, a first degree of freedom being defined along a longitudinal direction and a second degree of freedom being defined along a transverse direction, the transverse direction being substantially perpendicular to the longitudinal direction.

7. The piloting device according to claim 1, wherein the control module is configured to control the first position adjustment force based on the position data of the second control stick such that the position of the second control stick in relation to its neutral position and the position of the first control stick in relation to its neutral position are identical,
  the control module being further configured to control the second position adjustment force based on the first position adjustment force and the first restoring force.

8. A method for piloting an aircraft with a piloting device according to claim 1, the method comprising:

moving of the first control stick in at least one degree of freedom;

detection of the position of the first control stick by the detection system;

generation of position data representing the position of the first control stick by the detection system;

controlling of the second position adjustment force by the control module, based on the position data of the first control stick so that the position of the first control stick in relation to its neutral position and the position of the second control stick in relation to its neutral position are identical;

controlling of the first position adjustment force by the control module, based on the second position adjustment force and the second restoring force.

9. The method according to claim 8, further comprising:

applying of a control force to the second control stick by a crew member;

modification of the second position adjustment force by the control module, based on the control force applied to the second control stick by the crew member;

modification of the first position adjustment force based on the second position adjustment force and the second restoring force.

10. The piloting device according to claim 1, wherein the second position adjustment force counters the control force applied to the second control stick to maintain the position of the second control stick identical to the position of the first control stick.

11. A piloting device for piloting an aircraft comprising a first control stick and a second control stick, each movably mounted on a support between a plurality of positions around a neutral position in at least one degree of freedom, the piloting device further comprising:

a detection system for detecting the position of the first control stick and second control stick, configured to generate first position data representing the position of the first control stick and second position data representing the position of the second control stick;

a first elastic mechanism configured to apply a first restoring force to the first control stick, toward its neutral position;

a second elastic mechanism configured to apply a second restoring force to the second control stick, toward its neutral position;

a first actuation system configured to apply a first position adjustment force to the first control stick, according to each degree of freedom;

a second actuation system configured to apply a second position adjustment force to the second control stick, according to each degree of freedom;

a control module configured to control the second position adjustment force based on the position data of the first control stick so that the position of the first control stick in relation to its neutral position and the position of the second control stick in relation to its neutral position are identical;

wherein the control module is further configured to control the first position adjustment force based on the second position adjustment force and the second restoring force, wherein the second position adjustment force depends on a control force applied to the second control stick by an aircraft crew member, wherein the control module is configured to calculate the control force applied to the second control stick, the control force being equal to the second position adjustment force minus the second restoring force, wherein the first position adjustment force depends on the control force applied to the second control stick, wherein the first position adjustment force is equal to the control force multiplied by a correction coefficient, wherein the correction coefficient compensates for an asymmetry between roll restoring force profiles of the first and second elastic mechanisms.

12. A method for piloting an aircraft with a piloting device according to claim 11, the method comprising:

moving of the first control stick in at least one degree of freedom;

detection of the position of the first control stick by the detection system;

generation of position data representing the position of the first control stick by the detection system;

controlling of the second position adjustment force by the control module, based on the position data of the first control stick so that the position of the first control stick in relation to its neutral position and the position of the second control stick in relation to its neutral position are identical;

controlling of the first position adjustment force by the control module, based on the second position adjustment force and the second restoring force.

* * * * *